June 13, 1939.   H. H. BIXLER   2,162,570
VALVE ASSEMBLY
Filed April 1, 1937
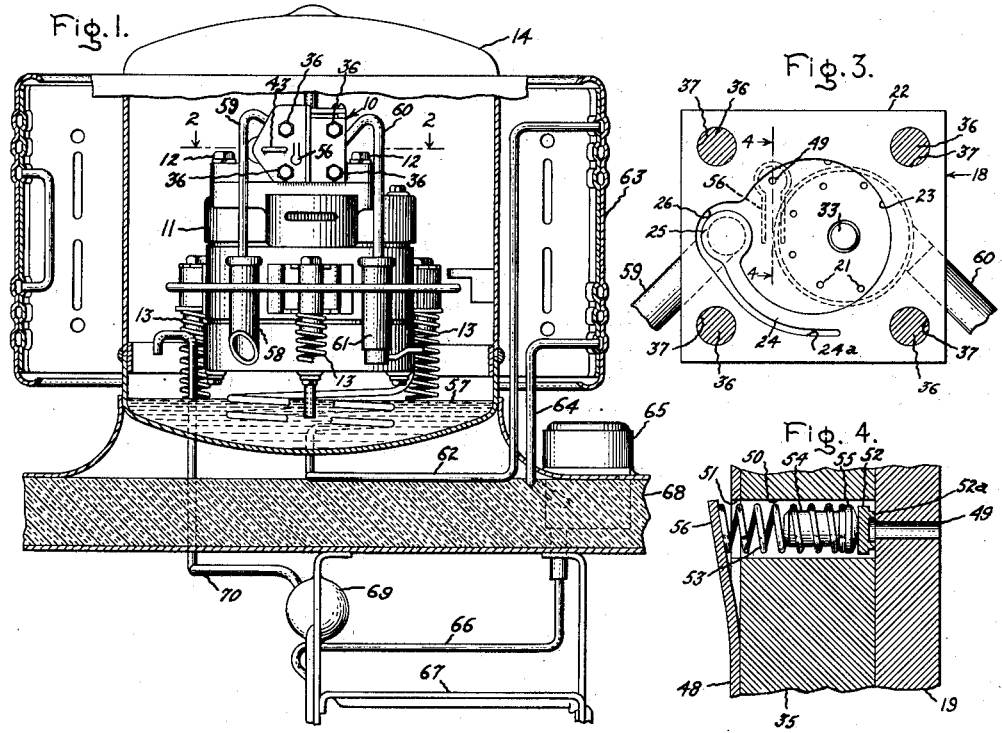
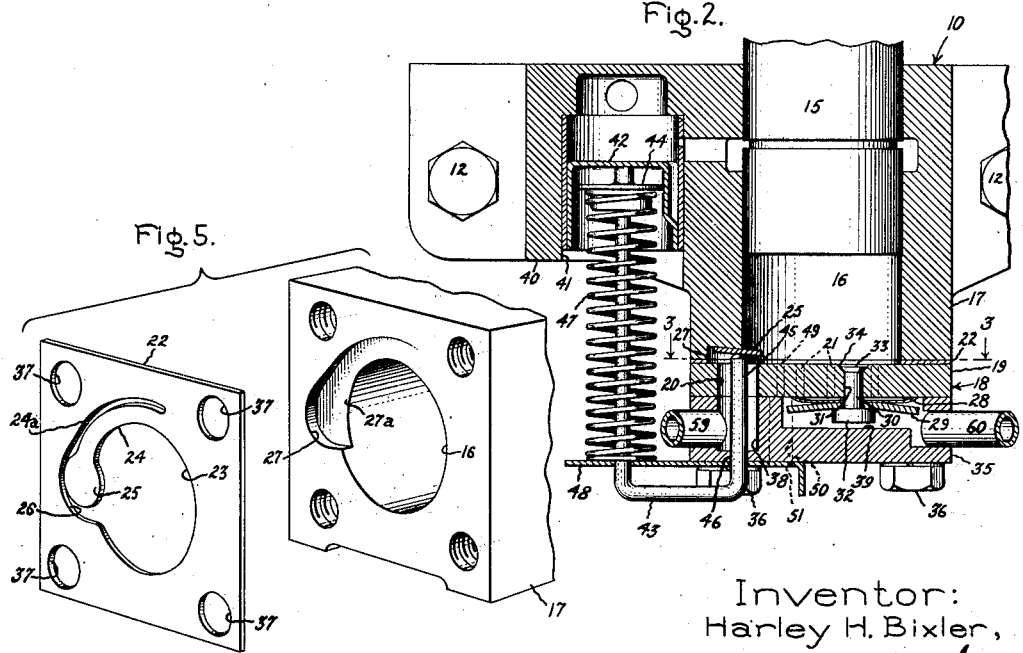
Inventor:
Harley H. Bixler,
by Harry E. Dunham
His Attorney.

Patented June 13, 1939

2,162,570

UNITED STATES PATENT OFFICE 2,162,570

VALVE ASSEMBLY

Harley H. Bixler, Schenectady, N. Y., assignor to General Electric Company, a corporation of New York Application April 1, 1937, Serial No. 134,329

9 Claims. (Cl. 277—60)

My invention relates to valve assemblies for compressors, or the like.

It is an object of my invention to provide a valve assembly for a compressor, or the like, which requires a minimum number of parts, which may be easily and economically manufactured and which is quiet and efficient in operation.

It is another object of my invention to provide a compressor, or the like, having a cylinder provided with a valve assembly including a flexible inlet valve element and an improved arrangement for supporting and for minimizing vibration of the inlet valve element.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawing in which Fig. 1 is a side elevation, partly in section, of a refrigerating machine including a compressor provided with a valve assembly embodying my invention; Fig. 2 is a plan view, partly in section, on the line 2—2 of the compressor included in the refrigerating machine shown in Fig. 1; Fig. 3 is a sectional view, on the line 3—3 of the valve assembly included in the refrigerant compressor shown in Fig. 2; Fig. 4 is a fragmentary sectional view on the line 4—4 of a relief valve included in the valve assembly shown in Fig. 3; and Fig. 5 is an exploded perspective view of an end of the compressor cylinder and an inlet valve supporting member included in the valve assembly secured thereto, shown in Fig. 2.

Referring to the drawing, in Fig. 1 I have shown a refrigerating machine including a compressor 10, which is secured to the top of a vertical electric driving motor 11 by a plurality of bolts 12, thus forming a unitary structure. The compressor 10 and the driving motor 11 are mounted on a plurality of equally spaced-apart supporting springs 13 and are arranged in an hermetically sealed casing 14. This compressor 10 is of the Scotch yoke type and includes a piston 15 which reciprocates in a longitudinal horizontal cylinder bore 16 formed in a cylinder 17. The open end of the cylinder bore 16 adjacent the head of the piston 15 is closed by a valve assembly 18.

The valve assembly 18 includes a flat rectangular valve plate 19 made of steel, or the like, and constituting a head for the cylinder bore 16. The valve plate 19 is provided with a relatively large inlet passage 20 extending therethrough and a series of relatively small discharge passages 21 extending therethrough. The discharge passages 21 are preferably arranged about the arc of a circle, as shown in Fig. 3. A thin, flat, rectangular inlet valve supporting member 22 formed of spring steel or the like extends across the face of the valve plate 19 adjacent the cylinder 17. It will be noted that the end of the cylinder 17 is also of rectangular configuration and has the same peripheral dimensions as the inlet valve supporting member 22 and the valve plate 19. The inlet valve supporting member 22 is provided with a centrally located punched aperture 23 which extends about the inner ends of the discharge passages 21, thus affording free communication between the cylinder bore and the discharge passages.

As best shown in Fig. 5, an elongated integral flexible arcuate-shaped inlet valve element or tongue 24 is punched in the inlet valve supporting member 22 and extends along the margin or periphery of the aperture 23. The inlet valve tongue 24 is provided with an enlarged circular end 25 which extends into a notch 26 formed in the side of the circular aperture 23, and a slot 24a extends about the tongue. The surface of the valve plate 19 is ground, or otherwise machined flat around the inner end of the inlet passage 20 thus forming a valve seat on which the enlarged end 25 of the inlet valve tongue 24 rests to close the inlet passage 20 during the operation of the compressor. An arcuate-shaped recess 27 is formed in the end of the cylinder 17 adjacent the cylinder bore 16 and extends about the end of the cylinder substantially 90° from a position adjacent the upper portion or top of the end of the cylinder to a position adjacent the side of the end of the cylinder. It will be noted that the recess 27 has an inclined bottom wall 27a which is substantially in the plane of the end of the cylinder 17 at the top thereof and is somewhat below the plane of the end of the cylinder adjacent the side thereof. The recess 27 surrounds the inlet valve tongue 24, and the bottom wall 27a thereof serves as a supporting wall for the inlet valve tongue 24 when the latter is flexed to a position displaced from the valve seat to open the inlet passage 20. The inlet valve tongue 24 is supported substantially throughout its entire length when it is flexed to its open position due to the inclination of the bottom wall 27a, which reduces stresses in the inlet valve tongue and minimizes vibration thereof and attendant breakage. During operation of the compressor, a thin film of lubricant accumulates in the recess 27 which further cushions opening movement of the inlet valve tongue 24 and minimizes traveling waves set up in the inlet valve tongues. The disposition of the recess 27 along the upper portion or top of the end of the cylinder 17 and adjacent the cylinder bore 16 prevents undue accumulation of lubricant therein and the tendency of the inlet valve tongue 24 to stick to the bottom wall 27a of the recess 27. Also, since the opening movement of the inlet valve tongue 24 is positively limited by the bottom wall 27a of the recess 27, its movement under the action of an unloader actuating rod, hereinafter described, is limited, as is the length of travel of the unloader actuating rod itself.

The discharge passages 21 formed in the valve plate 19 are closed by a slightly concave disk-shaped exhaust valve element 28, the exhaust valve element 28 being provided with a slightly convex disk-shaped retainer 29. The exhaust valve element 28 and the retainer 29 are secured to the valve plate 19 by a rivet 30, which passes through a hole 31 in the valve plate 19. It will be noted that the hole 31 is located at the center of the circle on the periphery of which the discharge passages 21 are located. The outer end of the rivet 30 is provided with an enlarged cylindrical head 32, and the inner end 33 thereof is peened over in a countersink 34 formed in the valve plate 19 at the inner end of the hole 31 therein.

The exhaust valve and retainer structure, described above, is not my invention, but is the invention of Christian Steenstrup, and is described and claimed in his copending application, Serial No. 26,068, filed June 11, 1935, now Patent No. 2,095,842, granted Oct. 12, 1937, and assigned to the General Electric Company, the assignee of my present invention.

The valve assembly 18 also includes a rectangular muffle box 35, secured to the outer face of the valve plate 19 by screws 36. The screws 36 pass through registering holes in the muffle box 35 and in the valve plate 19; they also pass through registering holes 37 formed in the inlet valve supporting member 22 adjacent the corners thereof. The inner ends of the screws 36 are secured in tapped holes formed in the cylinder 17. The screws 36 thus serve to secure the valve assembly 18, including the muffle box 35, the valve plate 19, and the inlet valve supporting member 22, on the open end of the cylinder 17. The muffle box 35 is provided with an inlet recess 38 formed therein, one end of which registers with the inlet passage 20. The muffle box 35 is also provided with a discharge recess 39 formed therein, which communicates with the outer ends of the discharge passages 21.

The compressor 10 is provided with an unloader cylinder 40 which is formed as an integral part of the casting of the compressor cylinder 17. The unloader cylinder 40 has a longitudinal cylindrical bore 41 formed therein, parallel to the compressor cylinder bore 16, in which an unloader piston 42 is arranged. A U-shaped operating rod 43 is secured at one end to a disk 44 rigidly mounted in the unloader piston 42, and the opposite end 45 of the operating rod 43 passes through a guiding bore 46 formed in the muffle box 35 and bears against the enlarged end 25 of the inlet valve tongue 24, thus opening the inlet passage 20. The operating rod 43 and unloader piston 42 are biased, to the position illustrated in Fig. 2, by a helical compression spring 47 mounted between the disk 44 and a retaining plate 48, which is secured to the muffle box 35 by two of the screws 36. By this arrangement the compressor 10 is unloaded in starting, as the inlet valve tongue 24 is held open until the compressor attains a predetermined per cent of its normal running speed. The compressor is loaded at that speed by oil pressure actuating the piston 42 to release the inlet valve tongue 24.

The compressor unloader structure described above forms no part of my present invention but is described and claimed in my copending application, Serial No. 1337, filed January 11, 1935, now Patent No. 2,102,403, granted Dec. 14, 1937, and assigned to the General Electric Company, the assignee of my present invention.

As shown in Figs. 3 and 4, a relief valve passage 49 is provided in the valve plate 19 within the periphery of the circular opening 23 formed in the inlet valve supporting member 22. The relief valve passage 49 communicates with a larger passage 50 formed in the muffle box 35, which in turn communicates with a hole 51 formed in the retaining plate 48. The relief passage 49 is normally closed by a disk-shaped relief valve element 52 having a narrow annular seating portion 52a. The relief valve element 52 is resiliently retained in position across the end of the relief passage 49 by a helical compression spring 53 held under compression between a stud 54 having an enlarged rounded end 55 bearing against the back of the relief valve element 52 and an integral tab 56 formed on the retaining plate 48 and extending across the hole 51 formed therein. The integral tab 56 is bendable with respect to the retaining plate 48 in order to adjust the tension upon the helical compression spring 53. The integral tab 56 directly engages one end of the helical compression spring 53 and the other end of the helical compression spring is tightly fitted on the body portion of the stud 54 in engagement with the back of the enlarged end 55 of the stud 54. The compression spring 53 normally biases the relief valve element 52 to the closed position illustrated in Fig. 4 and is made of such strength and so adjusted by bending the integral tab 56 that when the pressure within the compressor cylinder bore 16 extends a predetermined value considerably above the normal discharge pressure, the relief valve element 52 will be forced backward away from the end of the relief passage 49 and part of the compressed fluid contained in the cylinder bore 16 will be passed therefrom through the relief passage 49 and through the relief valve mechanism into the interior of the casing 14 until the pressure within the cylinder bore 16 falls to a safe value. The pressure in the cylinder bore 16 may rise to the predetermined abnormal value referred to because of an obstruction in the condenser, failure of the discharge valve to open, or for some other similar reason. The compressor and condenser are thus protected from such abnormal pressures.

One side of the relief valve element 52 is in direct communication with the interior of the casing 14, which contains low pressure gaseous refrigerant, and constitutes a zone of relatively low pressure. It is particularly advantageous in such case to arrange the opposite side of the relief valve element 52 in direct communication with the interior of the cylinder bore 16 as shown, rather than with the interior of the discharge recess 39, for example. This will be more readily understood from a consideration of the cycle of pressures to which the relief valve element 52 is subjected, when arranged as illustrated in the drawing. The compressor 10 of the refrigerating machine ordinarily operates only about 25% of the time, when subjected to normal load. During such period of operation, the pressure of the gaseous refrigerant compressed in the cylinder bore 16 exceeds the pressure of the gaseous refrigerant in the casing 14 by a substantial amount for only about half of each compression stroke. As a consequence, there is a pressure exerted on the inner face of the valve element 52 tending to unseat the same during only about one-sixteenth of the total elapsed time in which the machine is in use. The strain on the compression spring 53 is thus minimized and its life consequently increased. The high pressure in the cylinder bore 16 is applied to the relief valve element 52 in alternation with a low pressure in the cylinder bore 16 during the suction stroke of the piston 15 therein, so that the high pressure or unseating pressure is never continuously applied during the normal operation of the machine. This is advantageous since I have found that if high pressure gas, such as that contained in the discharge recess 39, is continuously applied to the inlet side of the relief valve element 52, the relief valve element may be gradually moved from its seat a slight distance, so that it in effect floats on a gas film and permits a continous leakage of gas. On the other hand, when the relief valve element 52 is arranged as shown in the drawing, so that it is drawn against its seat on each suction stroke of the piston 15, the seating of the valve element is maintained in its proper condition and leakage is prevented. I prefer to employ a relatively narrow annular seating portion 52a on the relief valve element 52 to minimize sticking of the valve on its seat. Gum-like oil, rust or other foreign matter may collect on the seating portion of the relief valve element, but if the seating area is made small, such foreign matter will not prevent the proper opening of the relief valve element when the predetermined pressure conditions prevail.

In the operation of the refrigerating machine, shown in Fig. 1, when the electric driving motor 11 is started, lubricant is supplied under pressure by a pump (not shown) from the body of lubricant 57 contained in the lower portion of the hermetically sealed casing 14 to the bore 41 of the unloader cylinder 40. When the compressor reaches about 60 per cent of full speed, the pressure of the accumulated lubricant within the unloader cylinder 40 moves the piston 42 and operating rod 43 outwardly against the bias of the spring 47, so that the end 45 of the operating rod 43 disengages the enlarged end 25 of the inlet valve tongue 24, and the latter is released for normal operation. Gaseous refrigerant contained in the hermetically sealed casing 14 enters an intake muffler 58, passes through a conduit 59 to the inlet recess 38 formed in the muffle box 35, and then to the inlet passage 20 formed in the valve plate 19. When the reciprocating piston 15 is retracted within the compressor cylinder bore 16, the pressure therein is decreased and the resilient inlet valve tongue 24 is consequently flexed inwardly, under the pressure of the gas in the inlet passage 20, thus opening the inner end of the inlet passage and allowing the compressor cylinder bore 16 to be filled with gaseous refrigerant. At the same time, the discharge valve element 28 is substantially flattened against the valve plate 19 by the pressure of the gas in the discharge recess 39 formed in the muffle box 35, thus closing the discharge passages 21. When the reciprocating piston moves toward the valve assembly 18 on the compression stroke, the pressure of gaseous refrigerant contained in the compressor cylinder bore 16 rises and the enlarged end 25 on the resilient inlet valve tongue 24 is flexed back into engagement with the valve seat to close the inlet passage 20, and the piston 15 then compresses the gas in the cylinder. When the pressure of the gaseous refrigerant compressed in the compressor cylinder bore 16 reaches a predetermined value with respect to the pressure of the gaseous refrigerant in the discharge recess 39, the discharge valve element 28 is flexed outwardly against the retainer 29 by the differential in pressure thus created, opening the discharge passages 21. The compressed gaseous refrigerant then passes from the compressor cylinder bore 16, through the discharge passages 21, into the discharge recess 39 formed in the muffle box 35, from which it passes through a conduit 60 to a discharge muffler 61.

The compressed gaseous refrigerant flows from the discharge muffler 61 through a conduit 62, to the upper end of a natural draft air-cooled condenser 63, where it is liquefied by the transfer of heat therefrom to the cooling air circulating over the surfaces of the condenser. The refrigerant liquefied in the condenser 63 flows therefrom through a conduit 64, passes through a flow-controlling float valve 65, and is supplied through a liquid line 66 to a flooded type evaporator 67. The evaporator 67 is supported on the lower side of a removable top wall 68 of a refrigerator cabinet, or the like, provided with a cooling compartment in which the exaporator 67 is located. The liquid refrigerant contained in the evaporator 67 is vaporized by the absorption of heat from the compartment in which it is located and the vaporized refrigerant is collected above the level of the liquid refrigerant in a header 69 of the evaporator 67. The vaporized refrigerant collected in the header 69 is then returned through a suction conduit 70, which is connected to the header 69, above the normal level of the liquid refrigerant therein, to the casing 14 above the level of the body of lubricant therein. The cycle above described is continuously repeated until the compartment in which the evaporator 67 is located is cooled to the desired temperature.

While I have shown a particular embodiment of my invention in connection with a compression type refrigerating machine, I do not desire my invention to be limited to the particular construction shown and described, and I intend in the appended claims to cover all modifications within the spirit and scope of my invention.

What I claim as new and desire to secure by Letters Patent of the United States is:

1. A valve assembly for a compressor, or the like, comprising a valve plate having an inlet passage and a discharge passage extending therethrough, said valve plate having a valve seat thereon extending about one end of said inlet passage, an inlet valve supporting member extending across one face of said valve plate and having an aperture therein extending about one end of said discharge passage, and an integral flexible inlet valve tongue formed on said valve supporting member, said inlet valve tongue extending along the margin of said aperture and cooperating with said valve seat to close said inlet passage.

2. A valve assembly for a compressor, or the like, comprising a valve plate having an inlet passage and a discharge passage extending therethrough, said valve plate having a valve seat thereon extending about one end of said inlet passage, an inlet valve supporting member extending across one face of said valve plate and having a circular aperture therein extending about one end of said discharge passage and a notch in one side of said circular aperture, an integral flexible inlet valve tongue formed on said inlet valve supporting member and extending along the periphery of said aperture, and means including an enlarged end formed on said inlet valve tongue and extending into said notch and cooperating with said valve seat to close said inlet passage.

3. A valve assembly for a compressor, or the like, comprising a valve plate having an inlet passage extending therethrough and a series of discharge passages extending therethrough and arranged on the periphery of a circle, said valve plate having a valve seat thereon extending about one end of said inlet passage, an inlet valve supporting member extending across one face of said valve plate and having a circular aperture therein extending about the ends of said series of discharge passages, and an integral flexible inlet valve tongue formed on said inlet valve supporting member, said inlet valve tongue extending along the periphery of said aperture and cooperating with said valve seat to close said inlet passage.

4. A valve assembly for a compressor or the like comprising a valve plate having an inlet passage, and a discharge passage extending therethrough, said valve plate having a valve seat thereon extending about the inner end of said inlet passage, an inlet valve supporting member extending across the face of said valve plate and having an aperture therein extending about one end of said discharge passage, an integral flexible inlet valve tongue formed on said inlet valve supporting member and extending along the margin of said aperture, said inlet valve tongue cooperating with said valve seat to close said inlet passage and flexing to a position displaced from said valve seat to open said inlet passage, means for supporting said inlet valve tongue throughout substantially the entire length thereof when said inlet valve tongue is flexed to its open position, and means for securing said valve plate and said inlet valve supporting member together.

5. A valve assembly for a compressor or the like comprising a valve plate having an inlet passage and a series of discharge passages arranged on the periphery of a circle extending therethrough, said inlet passage and said discharge passages communicating with said bore, said valve plate having a valve seat thereon extending about the inner end of said inlet passage, an inlet valve supporting member extending across the face of said valve plate having a circular aperture therein extending about the inner ends of said series of discharge passages, an integral flexible inlet valve tongue formed on said inlet valve supporting member and extending along the periphery of said aperture, said inlet valve tongue cooperating with said valve seat to close said inlet passage and flexing to a position displaced from said valve seat to open said inlet passage, means including a recess for supporting said inlet valve tongue throughout substantially the entire length thereof when said inlet valve tongue is flexed to its open position, and means for securing said valve plate and said inlet valve supporting member together.

6. A valve assembly for a compressor or the like comprising a valve plate having an inlet passage and a discharge passage extending therethrough, said valve plate having a valve seat thereon extending about the inner end of said inlet passage, an inlet valve supporting member extending across the face of said valve plate having an aperture therein extending about one end of said discharge passage, an integral flexible inlet valve tongue formed on said inlet valve supporting member and extending along the margin of said aperture, said inlet valve tongue cooperating with said valve seat to close said inlet passage and flexing to a position displaced from said valve seat to open said inlet passage, means including a recess for supporting said inlet valve tongue throughout substantially the entire length thereof when said inlet valve tongue is flexed to its open position, and means for securing said valve plate and said inlet valve supporting member together.

7. A valve assembly for a compressor, or the like, comprising a valve plate having an inlet passage and a discharge passage extending therethrough, said valve plate also having a relief passage extending therethrough, said valve plate having a valve seat thereon extending about one end of said inlet passage, an inlet valve supporting member extending across the face of said valve plate and having an aperture therein extending about one end of said discharge passage and of said relief passage, an integral flexible inlet valve tongue formed on said inlet valve supporting member and cooperating with said valve seat to close said inlet passage, a relief valve element arranged to close one end of said relief passage, means including a helical compression spring for biasing said relief valve element to close said relief passage, and means including a plate having a bendable tab member for adjusting the tension of said compression spring.

8. A valve assembly for a compressor, or the like, comprising a valve plate having an inlet passage and a relief passage extending therethrough and also having a series of discharge passages arranged on the periphery of a circle extending therethrough, said relief passage being positioned outside the periphery of said circle, said valve plate having a valve seat thereon extending about one end of said inlet passage, an inlet valve supporting member extending across one face of said valve plate and having a circular aperture therein extending about the ends of said series of discharge passages and said relief passage, an integral flexible inlet valve tongue formed on said inlet valve supporting member and extending along the periphery of said aperture, said inlet valve tongue cooperating with said valve seat to close said inlet passage, a relief valve element extending across one end of said relief passage, means including a helical compression spring for biasing said relief valve element to close said relief passage, and means including a plate having a bendable tab member for adjusting the tension of said compression spring.

9. A valve assembly for a compressor, or the like, comprising a valve plate having a relief passage therein, a muffle box mounted on said valve plate and having a passage therein communicating with said relief passage, a valve element arranged to close said relief passage, means including a helical compression spring mounted in said passage in said muffle box for biasing said valve element to close said relief passage, and means including a plate mounted on said muffle box having a bendable tab arranged over the end of said passage in said muffle box and engaging the end of said compression spring for adjusting the tension of said compression spring.

HARLEY H. BIXLER.